United States Patent [19]

Peterson et al.

[11] Patent Number: 5,294,272
[45] Date of Patent: Mar. 15, 1994

[54] METHOD OF PREFORMING PLASTIC FILM FOR APPLICATION TO A CONTOURED CAR WINDOW

[76] Inventors: Curtis A. Peterson; Eugene H. Smith, both of 506 W. 9th St., Mesa, Ariz. 85021

[21] Appl. No.: 982,840

[22] Filed: Nov. 30, 1992

Related U.S. Application Data

[63] Continuation of Ser. No. 807,171, Dec. 13, 1991, abandoned.

[51] Int. Cl.⁵ ............................................. B32B 31/00
[52] U.S. Cl. ...................................... 156/85; 156/99; 156/101; 156/267; 428/31; 428/202; 428/914
[58] Field of Search ............... 156/267, 99, 101, 84, 156/85, 86, 71, 102, 106, 152, 242; 428/31, 202, 430, 914

[56] References Cited

U.S. PATENT DOCUMENTS

| | | | |
|---|---|---|---|
| 3,953,273 | 4/1976 | Faller | 156/108 |
| 4,075,386 | 2/1978 | Willdorf | 156/104 |
| 4,842,664 | 6/1989 | Baudin | 156/102 |
| 4,959,118 | 9/1990 | Herbin et al. | 156/267 |
| 5,026,448 | 6/1991 | Raefler et al. | 156/263 |
| 5,085,721 | 2/1992 | Tanuma et al. | 156/108 |

Primary Examiner—Patrick J. Ryan
Assistant Examiner—Merrick Dixon
Attorney, Agent, or Firm—Joseph H. Roediger

[57] ABSTRACT

A method of applying a film having limited light transmitting qualities to the interior surface of a contoured car window wherein the film is first placed against the exterior surface of the window with its transfer coating facing outwardly. The film in this position is subjected to localized heating to selectively shrink the film and transfer coating to the window contour. Then, the film and coating are removed, the coating separated and the film adhered to the interior surface of the car window.

7 Claims, 1 Drawing Sheet

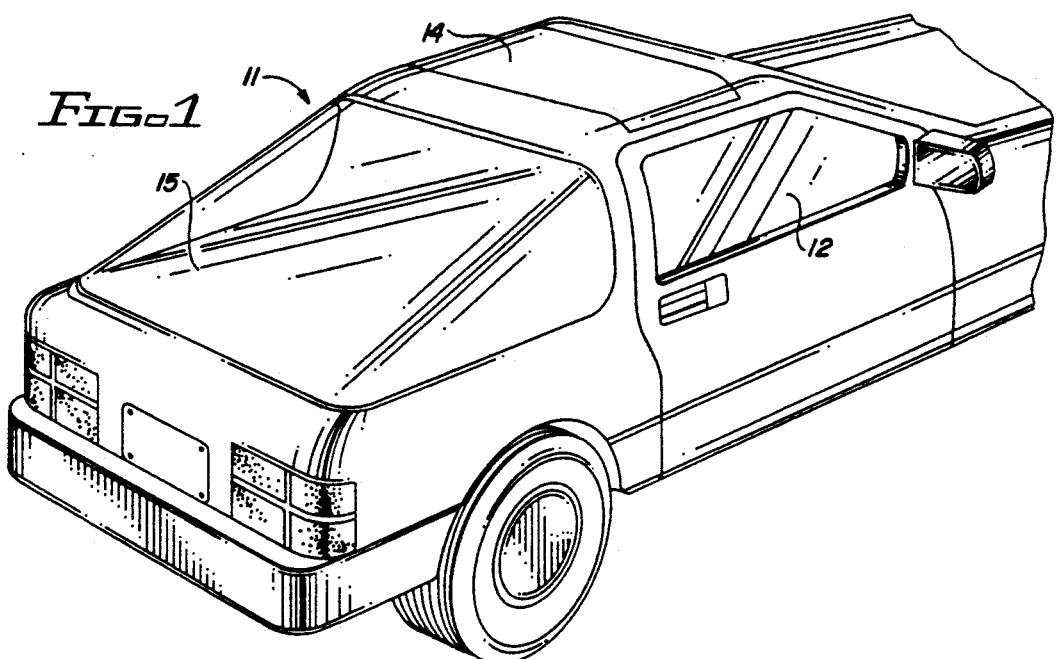
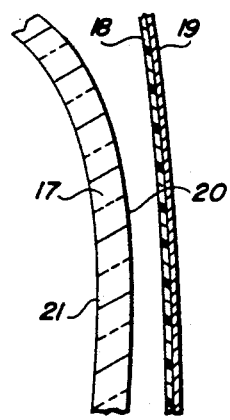 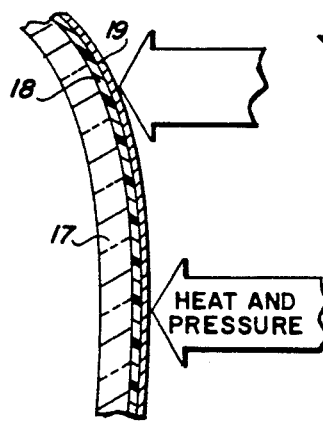 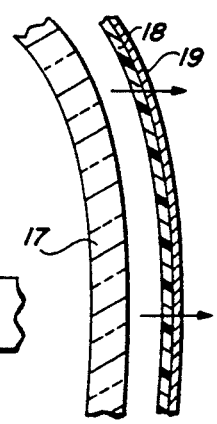
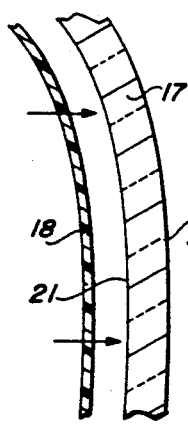 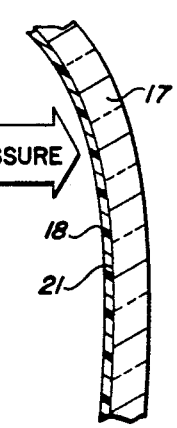
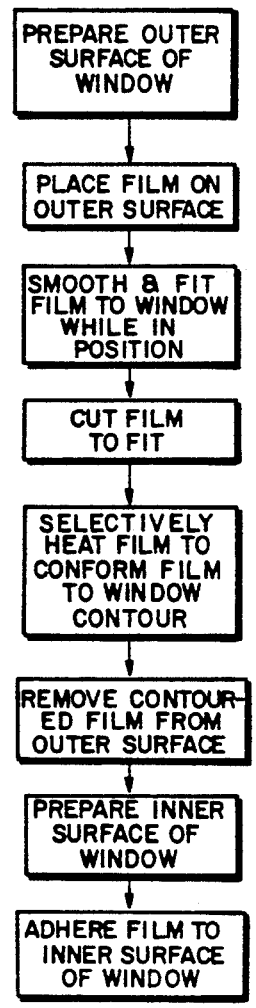

METHOD OF PREFORMING PLASTIC FILM FOR APPLICATION TO A CONTOURED CAR WINDOW

This application is a continuation of corresponding application Ser. No. 07/807,171, filed on Dec. 13, 1991, now abandoned.

BACKGROUND OF THE INVENTION

This invention relates to a novel method of applying a film of reduced light transmittance to the interior surface of a contoured car window.

In many regions of the United States, the intensity of the sunlight and the glare resulting therefrom have been found to be notable factors in causing motor vehicle accidents. The tinting of windows by the vehicle manufacturer has provided a measure of relief to the operator. In addition, the tinting of the windows reduces the damage to the vehicle interior caused by strong incident light over a long period of time. However, the need has been recognized for additional means of reducing the combination of direct and reflected light entering a vehicle. To this end, a number of manufacturers now provide plastic film for placement on car windows. The films are characterized by reducing the amount of light transmitted therethrough in both the visible and invisible spectral regions. Typically, commercially available films exhibit substantial blocking characteristics for light having a frequency in the ultraviolet portion of the spectrum.

The reduced light transmissive films are generally made with an adhesive layer provided on one side of a plastic film with a removable plastic transfer coating thereon. The transfer coating is removed at the time of installation to permit adherence of the film to the window surface. Since the film is less durable than the glass substrate, the application of the film to a vehicle window takes place on its interior surface where it is protected from the weather. As a result, the customary procedures for adhering film to the window are difficult to perform. The difficulty is due to the fact that the operator is applying flexible film to the windows from a position within the vehicle. Considerable skill is required for a successful application. As a result, the vehicle owner is not normally capable of satisfactorily applying the film. Commercial establishments specializing in the application of films to vehicle windows have come into existence to satisfy this commercial need.

The typical approach to applying a plastic film begins with the initial placement of a combination of film and transfer coating thereon against the surface of the window. This outlines the dimension of the film to be applied and it is then cut to size. Following the dimensioning, the transfer coating is removed to expose the adhesive layer. The layer on the film is then placed in direct contact with the interior surface of the car window. The process works reasonably well with installations wherein flat glass surfaces serve as the substrate. However, present day vehicles rarely have flat glass windows. Virtually every window on today's vehicles is contoured for aesthetic and/or aerodynamic purposes, thereby rendering the application of the film more difficult. In addition to the fact that vehicle windows are now contoured, recent styling changes have greatly increased the area of the contoured windows especially rear windows in those models having sloping or hatch backs. Applying the film to the larger areas of contoured windows makes the process of conforming the film to the interior window surface even more difficult. In order to successfully deal with the large area contoured window, it is standard practice to divide the window into a plurality of segments and then to apply the film in pieces. By subdividing the film, it is easier to provide large area coverage from the car interior.

In the case of both unitary or segmented film applications, the conventional practice is to apply tension to the film to alter its original dimensions. The stretching of the film is used in conforming the film to the window surface. Stretching eliminates for the most part the buckles, fingers and creases that arise from the placement of a flat film on a curved window surface. As a result of the film being stretched, the adhesive layer, placed on the film initially as a layer of uniform thickness, becomes thinner in the regions stretched. Since the stretching most often occurs at those areas where the window contour undergoes a significant change, the adhesive layer becomes thinned in the region where the film is most severely stressed. These regions are the areas where the film is most likely to undergo a later separation from the glass substrate. As a result, film stretching during installation materially reduces the useful lifetime of the installed product.

One approach taken to limit the amount of film stretching is to segment the plastic film prior to application. However, the segmenting of the film results in seams extending across the window. Applying multiple segments calls for increased care and effort to ensure that the segments directly abut one another over the long dimensions. Any gaps, overlaps or edge-raising will be prominently displayed leading to customer dissatisfaction and impairment of an otherwise unobstructed view. Furthermore, the dimensional changes that the film undergoes over a period of time promotes the formation of gaps right across the long dimension of the window. This is both unsightly and potentially dangerous if the sun rays passing through the crack are directed onto the face of the driver.

Accordingly, a primary object of the present invention is the provision of a method for installing window film which reduces the number of steps required to cover a contoured window by essentially eliminating the need to treat the window in segments. The invention reduces the need to stretch the film which normally produces localized reductions in the adhesive layer. Consequently, the useful lifetime of the applied film is increased. The present method can be used to eliminate the transverse seams heretofore existing in plastic film applied to large area contoured windows.

SUMMARY OF THE INVENTION

This invention relates to a method for the application of a plastic film having light transmittance reducing characteristics to contoured or curved car windows. The plastic film has an adhesive layer with an overlying transfer coating thereon to be removed at the moment of affixation to the window surface.

In the practice of this novel method, the film is initially placed on the exterior surface of the window with the transfer coating facing outwardly and forming the exposed surface. At this point, the film can be dimensioned if it has not been presized. This would require removal of the film from the window, cutting the film and then replacing the film on the exterior surface of the window again with the transfer coating facing out. Next, heat is applied to the transfer coating and underlying film to selectively shrink the transfer coating and film. The selective shrinking of localized areas is found to promote conformance thereof to the contour of the window surface. At this point in the process, the conformed film with the transfer coating thereon is removed from the exterior surface of the window. Care is then used to separate the transfer coating from the contoured film. The separation is accomplished without changing the film contour. The installer then adheres the contoured film to the interior surface of the window.

By preforming the combination of film and transfer coating thereon without subjecting the combination to tension, the adhesive layer is not significantly reduced in thickness in the stretched areas. In general, the shrinking of selected portions of the film results in a buildup in the thickness of adhesive layer at those points likely to experience significant stress during both application and in continued use. Consequently, the likelihood of separation of film and glass substrate is reduced through the use of the present process. Furthermore, the preforming of the contoured film occurs through operations performed outside the confined space of the vehicle. The number of operations conducted within the vehicle is reduced by the present process.

Further features and advantages of the present invention will become more readily apparent from the following detailed description of a specific embodiment thereof when taken in conjunction with the accompanying drawings.

BRIEF DESCRIPTION OF THE DRAWINGS

FIG. 1 is a partial view in perspective of a large contoured car window.

FIGS. 2A through 2E are partial section views illustration the steps of the process.

FIG. 3 is a block schematic diagram showing the sequence of steps in the present embodiment.

DESCRIPTION OF THE PREFERRED EMBODIMENT

Referring now to FIG. 1, the rear section of a typical car is shown having a number of different glass surfaces. All of these surfaces are contoured in present day vehicles to provide the advantages of reduced wind resistance and gas consumption. As shown, vehicle 11 has curved side windows 12, a curved removable roof insert 14 and a rear window 15. The rear window 15 has side extensions as well as a sloping rear section to provide a variety of compound curved surfaces. The application of a plastic film with the ability to reduce the passage of light into the car interior is a troublesome process for vehicles of this type. As noted previously, the conventional approach is to divide the rear window into segments and cover these segmented portions with individual pieces of film. Consequently, seams extend transversely across the back window and may be present where the side portions meet the top surface of window 15. The attempt to contour a planar plastic sheet to these different curved surfaces from within the limited working space of the interior of the car make this a difficult project even for a segmented window treatment. The present method is directed to the preforming of the plastic film before operations are conducted within the vehicle interior.

The light transmission characteristics of the plastic film used to coat car windows vary according to the manufacturer specifications. However, the films share several common characteristics including the ability to reduce the transmission of light in the visible portion of the spectrum as well as severely reducing the transmission of ultraviolet light therethrough. The percentage of visible light blocked from transmission through these plastics films is a matter of state law. One purpose of the film is to reduce the direct and reflected visible light encountered by a driver which would tend to obscure his vision during operation. The ability to screen for ultraviolet light is also important since the effects thereof on the interior fabrics and coverings is quite deleterious over a period of time. In those portions of the United States which experience a large number of days having strong sunshine, the ultraviolet light causes embrittlement and fading of the synthetic materials used for fabrics and interior components.

The plastic films in general use for the above purposes have in common the fact that they are formed of a polyester with a proprietary adhesive layer carried on one surface. A transfer coating, typically formed of polypropylene, is removably adhered to the adhesive layer. The combination of plastic film, adhesive layer and transfer coating are sold in bulk form by the manufacturers. One product found to be well-suited for use in the subject process is the film sold under the trademark INSUL and made by Courtalds, Inc. A number of other manufacturers provide similar plastic film-type materials for use as described. These materials are characterized by a plastic film that adheres to the interior of the car window by an adhesive layer protected by a transfer coating of a different plastic.

The steps of the present method are shown in the block diagram of FIG. 3. Initially, the outer surface of the window is prepared by conventional washing to assure that the plastic film will not be scratched when placed in position thereon. The film is positioned with the transfer coating out and is placed in direct contact with the exterior surface of the window. The film is smooth and fitted to the window in this reverse position. If it has not been precut or should trimming be necessary, the material may be removed and trimmed or can be trimmed in place.

In the preferred practice of the present method, the outer surface of the window is preferably kept wetted with a mixture of soap and water to promote slippage of the film thereon when established in position. When positioned against the outside surface of the window, a small flexible member, preferably a plastic card, can be run across the exposed transfer coating to remove any excess moisture. Since the glass substrate upon which the film rests is contoured, typically in more than one direction, the film initially does not rest comfortably thereon. As a result, there exist buckles or fingers or other evidences of nonconformity in the film. The method next calls for the selective application of heat to the combination of transfer coating, adhesive layer and plastic film to promote conformance. The application of heat has been found to provide localized shrinking of the overall combination so that the buckles, pouches and fingers are ultimately eliminated and the desired conformance is obtained.

The selective application of the heat is accomplished by the use of a heated air stream directed to the site of the nonconformity. The duration of the treatment depends on the severity of the nonconformity. Experience has shown that essentially all nonconformaties resulting from the placement of a planar plastic film on a car window will be eliminated. Furthermore, the combination of transfer coating, adhesive layer and plastic film are found to assume and maintain this new shape when removed from the exterior surface of the window.

The steps are shown in FIGS. 2A, 2B and 2C wherein the exterior surface 20 of car window 17 is shown spaced from a combination of plastic film 18 having an adjacent transfer coating 19 adhered thereto by an intermediate adhesive layer. The combination is shown in FIG. 2A as a relatively straight member which is then placed on the exterior surface 20 as shown in FIG. 2B. The application of a hot air stream coupled by pressure if necessary will cause the aforementioned shrinkage so that the combination member does conform to the window contour. The pressure can be exerted by using the fingertips or the flexible card used to remove excess moisture. During the step shown in FIG. 2B, the plastic film 18 is in contact with exterior surface 20 of the car window. Since the transfer coating 19 is directly subjected to the heat and any pressure that might be applied, the film is protected and is not damaged by the process. At the conclusion of this step, the combination 20 is removed as shown in FIG. 2C retaining the contour imparted by the selective shrinking.

The transfer coating 19 is then removed from the contoured plastic film 18 and discarded. The contoured film is carried into the vehicle and placed in contact with the inner surface 21 of window 17 which has been wetted to permit sliding and to activate the adhesive layer on the film. The removal of the transfer coating 19 does not cause a removal of the adhesive layer which remains in position to adhere the film 18 to the window surface 21. By preforming the desired contour, the amount of working of the plastic film to position it on the window surface 21 is minimized. The buckles, pouches and fingers heretofore experienced with other methods of application are not present and the film 18 need not be placed under significant tension and stretched. As previously noted, the prior processes practice this stretching and reduce the adhesive layer in the very regions in which maximum film adherence is needed.

The final product is shown in FIG. 2E wherein the precontoured film 18 is adhered to window 17. Any necessary movement of the film during adherence is for positioning only and not for removal of discontinuities. The practice of the present method has been found to permit the use of single piece window treatments for severely contoured large area windows as shown in the car of FIG. 1. In the event that a single piece is found impractical due to size, the number of segments required for a dramatically curved large area window can be substantially reduced from the number of segments required in the processes presently utilized. If the expansion characteristics of the transfer coating do not completely match the expansion characteristics of the plastic film during the application of the heated air, the use of moderate amounts of pressure will cause the transfer coating to adjust thereby enabling the adjacent plastic film to be comformably contoured without significant stretching. The adhesive layer is not directly influenced by relative changes in dimension of the transfer coating so that the thinning of the adhesive layer does not occur in the practice of the present method.

While the foregoing description has referred to a specific embodiment of the present invention, it is to be noted that various modifications and variations may be made therein without departing from the scope of the invention as claimed.

I claim:

1. A method for the application of a plastic film to the first curved surface of a flexible window having first and second opposing curved surfaces, said film having an adhesive layer and transfer coating thereon, the method comprising the steps of:
   a) placing the film on the second surface of the window with the transfer coating forming the exposed surface;
   b) selectively applying heat by directing a heated air stream onto the transfer coating and film to selectively shrink said transfer coating and film to cause conformance thereof to the contour of the window;
   c) removing the conformed film and transfer coating from the second surface of the window;
   d) separating the transfer coating from the contoured film; and
   e) adhering the contoured film to the first surface of the window.

2. The method in accordance with claim 1 further comprising the initial steps of:
   a) first placing the film and transfer coating on the second surface of the window with the transfer coating forming the exposed surface; and
   b) cutting the film to fit the window.

3. The method in accordance with claim 2 further comprising the step of applying a moisture coating to the second surface of the window prior to placing the cut film thereon.

4. The method in accordance with claim 3 further comprising the step of preparing the first surface of the window to receive the contoured film thereon.

5. The method in accordance with claim 4 wherein the transfer coating is a plastic member releasably secured to the film.

6. The method in accordance with claim 5 wherein said plastic member is comprised of polypropylene.

7. The method in accordance with claim 6 wherein said film is comprised of a polyester film.

* * * * *

UNITED STATES PATENT AND TRADEMARK OFFICE
CERTIFICATE OF CORRECTION

PATENT NO. : 5,294,272
DATED : March 15, 1994
INVENTOR(S) : Curtis A. Peterson; Eugene H. Smith It is certified that error appears in the above-identified patent and that said Letters Patent is hereby corrected as shown below:

Column 6, line 15:

Claim 1, preamble should read:

1. A method for the application of a flexible plastic film to the first curved surface of a window having first and second opposing curved surfaces, said film having an adhesive layer and transfer coating thereon, the method comprising the steps of:

Signed and Sealed this

Twenty-eighth Day of June, 1994

Attest:

BRUCE LEHMAN

Attesting Officer   Commissioner of Patents and Trademarks